US012652300B2

(12) United States Patent
Yao et al.

(10) Patent No.: US 12,652,300 B2
(45) Date of Patent: Jun. 9, 2026

(54) PROBABILISTIC EVIDENCE BASED INSIDER THREAT DETECTION AND REASONING

(71) Applicant: Virginia Tech Intellectual Properties, Inc., Blacksburg, VA (US)

(72) Inventors: Danfeng Yao, Blacksburg, VA (US); Md Salman Ahmed, Blacksburg, VA (US); Ya Xiao, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 519 days.

(21) Appl. No.: 18/009,873

(22) PCT Filed: Jun. 14, 2021

(86) PCT No.: PCT/US2021/037240
§ 371 (c)(1),
(2) Date: Dec. 12, 2022

(87) PCT Pub. No.: WO2021/253003
PCT Pub. Date: Dec. 16, 2021

(65) Prior Publication Data
US 2023/0269264 A1 Aug. 24, 2023

Related U.S. Application Data

(60) Provisional application No. 63/038,308, filed on Jun. 12, 2020.

(51) Int. Cl.
*H04L 9/40* (2022.01)
*G06F 11/34* (2006.01)
(Continued)

(52) U.S. Cl.
CPC ...... *H04L 63/1425* (2013.01); *G06F 11/3438* (2013.01); *G06F 17/18* (2013.01); *H04L 63/1416* (2013.01)

(58) Field of Classification Search
CPC ............ H04L 63/1425; H04L 63/1416; G06F 11/3438; G06F 17/18
(Continued)

(56) References Cited

U.S. PATENT DOCUMENTS 8,707,431 B2 * 4/2014 Stephens ............. H04L 63/1408
726/22
9,589,245 B2 * 3/2017 Coden ................... G06F 21/554
(Continued)

OTHER PUBLICATIONS

Paul J. Sticha; Using dynamic models to support inferences of insider threat risk; Springer:2016; pp. 350-382.*
(Continued)

*Primary Examiner* — Monjur Rahim
(74) *Attorney, Agent, or Firm* — New River Valley IP Law, P.C.; Michele L. Mayberry; Ashley M. Gates

(57) ABSTRACT

The main enabler of the technology is the probabilistic programming based computation strategies that have an outstanding ability to handle uncertainties in discovering anomalous patterns. This new capability to handle uncertainties is particularly relevant for detecting insider threats, as there are usually no clearly defined rules and policies. An insider's behaviors would deviate from normally distributed events and actions in various aspects. The probabilistic model detects this deviation and explains the computational path of the deviation. The result interpretation unit enables organizations to investigate the causes with high accuracy, avoiding costly and embarrassing false alarms. The technology detects and ranks abnormal events. This ranking capability helps prioritize follow-up manual investigation.

24 Claims, 7 Drawing Sheets

(51) Int. Cl.
*G06F 17/18* (2006.01)
*G06F 21/55* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 9,609,010 | B2 * | 3/2017 | Sipple | H04L 63/1425 |
| 10,050,985 | B2 * | 8/2018 | Mhatre | H04L 63/1416 |
| 10,290,053 | B2 * | 5/2019 | Priess | G06Q 50/265 |
| 10,938,845 | B2 * | 3/2021 | Elsner | G06N 7/01 |
| 2008/0215576 | A1 * | 9/2008 | Zhao | G06F 16/337 |
| | | | | 707/999.005 |
| 2015/0026027 | A1 * | 1/2015 | Priess | G06Q 10/04 |
| | | | | 705/35 |
| 2017/0230392 | A1 * | 8/2017 | Dean | H04L 63/1425 |

| | | | | |
|---|---|---|---|---|
| 2018/0248902 | A1 * | 8/2018 | Dănilă-Dumitrescu | |
| | | | | H04L 67/535 |
| 2018/0314965 | A1 * | 11/2018 | Dodson | G06N 20/00 |
| 2019/0349391 | A1 * | 11/2019 | Elsner | H04L 63/1425 |
| 2020/0219616 | A1 * | 7/2020 | Swift | G06N 3/08 |
| 2021/0110282 | A1 * | 4/2021 | McCann | H04L 63/1416 |

OTHER PUBLICATIONS (Yao, Danfeng et al.) Co-pending International Application No. PCT/US21/37240, filed Jun. 14, 2021, Specification, claims, and figures, 49 pages.
Co-pending International Application No. PCT/US21/37240, International Search Report and Written Opinion, dated Sep. 23, 2021, 16 pages.
Philipson, J. "Improving Insider Threat Detection with Evidence-Based Reporting", Homeland Security Today, Government Technology & Services Coalition, Apr. 22, 2020.

\* cited by examiner

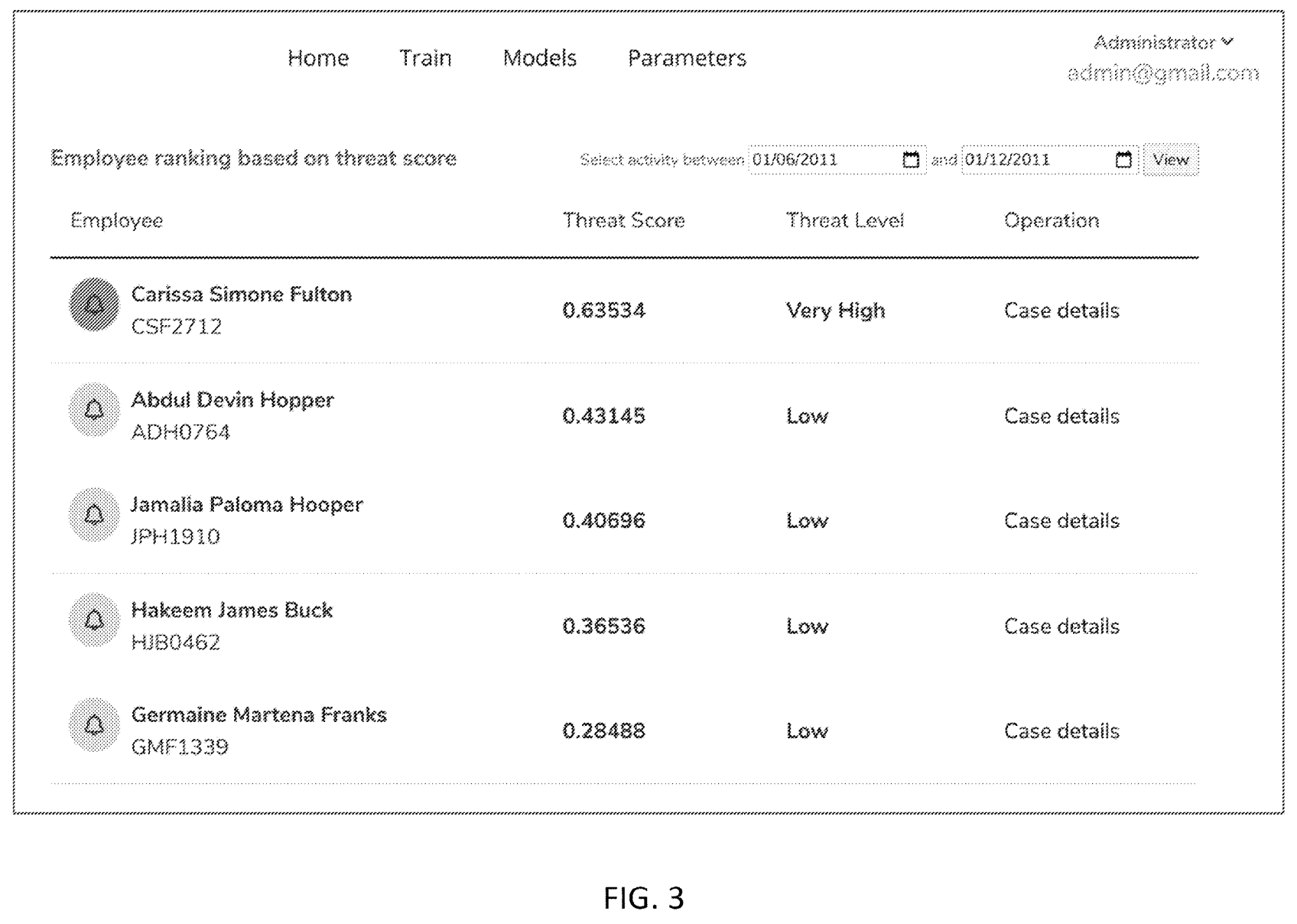

Home　Train　Models　Parameters

Administrator ⌄
admin@gmail.com

Employee ranking based on threat score

Select activity between 01/06/2011 ▢ and 01/12/2011 ▢ View

| Employee | Threat Score | Threat Level | Operation |
|---|---|---|---|
| Carissa Simone Fulton<br>CSF2712 | 0.63534 | Very High | Case details |
| Abdul Devin Hopper<br>ADH0764 | 0.43145 | Low | Case details |
| Jamalia Paloma Hooper<br>JPH1910 | 0.40696 | Low | Case details |
| Hakeem James Buck<br>HJB0462 | 0.36536 | Low | Case details |
| Germaine Martena Franks<br>GMF1339 | 0.28488 | Low | Case details |

FIG. 3

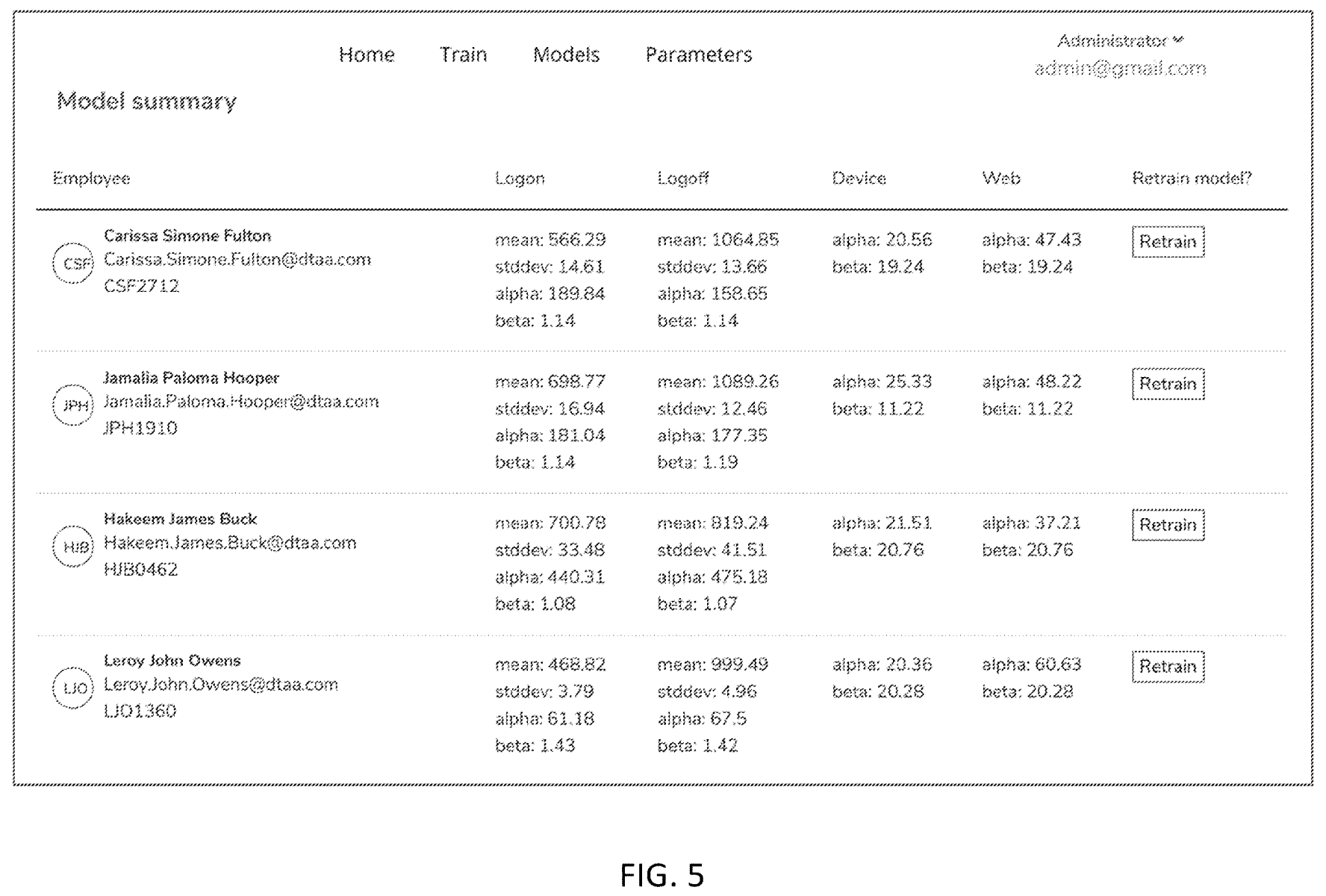

Home     Train     Models     Parameters

*Administrator* ∨
admin@gmail.com

Model summary

| Employee | Logon | Logoff | Device | Web | Retrain model? |
|---|---|---|---|---|---|
| Carissa Simone Fulton<br>Carissa.Simone.Fulton@dtaa.com<br>CSF2712 | mean: 566.29<br>stddev: 14.61<br>alpha: 189.84<br>beta: 1.14 | mean: 1064.85<br>stddev: 13.66<br>alpha: 152.65<br>beta: 1.14 | alpha: 20.56<br>beta: 19.24 | alpha: 47.43<br>beta: 19.24 | Retrain |
| Jamalia Paloma Hooper<br>Jamalia.Paloma.Hooper@dtaa.com<br>JPH1910 | mean: 698.77<br>stddev: 16.94<br>alpha: 181.04<br>beta: 1.14 | mean: 1089.26<br>stddev: 12.46<br>alpha: 177.35<br>beta: 1.19 | alpha: 25.33<br>beta: 11.22 | alpha: 48.22<br>beta: 11.22 | Retrain |
| Hakeem James Buck<br>Hakeem.James.Buck@dtaa.com<br>HJB0462 | mean: 700.78<br>stddev: 33.48<br>alpha: 440.31<br>beta: 1.08 | mean: 819.24<br>stddev: 41.51<br>alpha: 475.18<br>beta: 1.07 | alpha: 21.51<br>beta: 20.76 | alpha: 37.21<br>beta: 20.76 | Retrain |
| Leroy John Owens<br>Leroy.John.Owens@dtaa.com<br>LJO1360 | mean: 468.82<br>stddev: 3.79<br>alpha: 61.18<br>beta: 1.43 | mean: 999.49<br>stddev: 4.96<br>alpha: 67.5<br>beta: 1.42 | alpha: 20.36<br>beta: 20.28 | alpha: 60.63<br>beta: 20.28 | Retrain |

FIG. 5

Case details

| Jan. 6, 2011 | Jan. 11, 2011 | Jan. 12, 2011 |
|---|---|---|
| Attribute's anomalous probability: | Attribute's anomalous probability: | Attribute's anomalous probability: |
| Logon (0.96) → Device (1.0) → Domain (0.8) → File Copy (0.66) → Logoff (1.0) | Logon (0.99) → Device (1.0) → Domain (0.03) → File Copy (0.24) → Logoff (0.25) | Logon (0.16) → Device (1.0) → Domain (0.8) → File Copy (0.91) → Logoff (1.0) |
| Multiple logons at [4:51, 7:17, 11:29, 4:51, 7:17, 11:29] | Multiple logons at [7:15, 12:17, 22:49, 7:15, 12:17, 22:49] | Multiple logons at [7:25, 12:16, 7:25, 12:16] |
| External device usage: [4 times] | External device usage: [2 times] | External device usage: [2 times] |
| Less frequent domains ['wikileaks.org'] | Less frequent domains ['eventbrite.com'] | Less frequent domains ['wikileaks.org'] |
| Files copied: [2 times] | Multiple logoffs at [18:2, 18:2] | Files copied: [4 times] |
| Multiple logoffs at [5:27, 18:15, 5:27, 18:15] | | Multiple logoffs at [1:21, 18:3, 1:21, 18:3] |

FIG. 6

Home     Train     Models     Parameters

Administrator ˅
admin@gmail.com

Parameter summary and tuning

| Parameter | Description | Current Value |
|---|---|---|
| P1 Probability threshold | Probability threshold is the maximum safe probability. | 0.95 |
| P2 Learning rate | Learning rate is necessary for training probabilistic models. | 0.011 |
| P3 Number of steps | Number of steps is necessary for training probabilistic models. | 1500 |
| P4 Top k | Top k attributes to aggregate | 7 |

Tune Parameters

Probability threshold:

Learning rate:

Number of steps for training:

Number of top attributes to aggregate:

Save

FIG. 7

PROBABILISTIC EVIDENCE BASED INSIDER THREAT DETECTION AND REASONING

CROSS-REFERENCE TO RELATED APPLICATIONS

This application relies on the disclosure of and claims priority to and the benefit of the filing date of U.S. Provisional Application No. 63/038,308 filed Jun. 12, 2020, which is hereby incorporated by reference herein in its entirety.

BACKGROUND OF THE INVENTION

Field of the Invention

The present invention relates to the field of insider threat detection. More specifically, embodiments include methods and systems to detect deviations of an insider's behavior from normally distributed events and actions.

Description of Related Art

Stephens et al. describe detecting insiders using Bayesian networks in U.S. Pat. No. 8,707,431. There are several main differences. First, Stephens et al. assumes a Bayesian network for the organization—the most important detection enabler—is already built and available, which is unrealistic in practice. The present invention, which is, in embodiments, fully automated, does not require this assumption. The present invention additionally comprises methods to automatically compute all the necessary probability information. Second, the Bayesian network is static, i.e., once built, it does not change. For large organizations, this static model is typically too rigid. For example, it cannot accurately reflect fluctuations and changes in normal activities (e.g., changes in behavior/access patterns due to new tasks). In comparison, the present invention comprises a system which is dynamic and has the ability to adjust itself constantly. Finally, Stephens et al. has low deployability, as each individual organization needs to build its own Bayesian network before the detection method can be used. This scenario is not feasible in practice. In embodiments, the present invention is plug-and-play and easy to deploy. When deploying the present invention, every organization deploys the same copy of code, but the technology can automatically learn the normal patterns of the organizations.

In U.S. Pat. No. 9,589,245, Coden et al. described an insider threat detection system using a pattern or rule-based activity classification technique. The detection system extracts features from activities and classifies outlier activities using one or more matching patterns of insider threats with probabilities greater than predefined threshold values. Based on the matches, the system calculates threat scores for individual activities and predicts insider threats by aggregating the individual scores. In comparison, in embodiments, the system of the present invention learns the normal behavior of each activity and determines the outlier activities based on the deviation of activities from the most popular activities. The main difference is that the inventive system does not rely on predefined matching rules or patterns. Predefined rules or patterns as in the '245 patent cannot detect unknown new threats. The system of the present invention also uses threshold values to indicate the deviations, but the thresholds are learned, not predefined. This threshold learning process makes the model adaptive to data changes.

In U.S. Pat. No. 10,050,985, Mhatre et al. disclosed an insider threat detection system which considers the internal network traffic of an organization. The system identifies metadata, such as source and destination hosts, network ports, communication attempts, amount of data sent/received, communication frequencies, and communication times from network assets or actors. The system generates an n-dimensional data space representation of the metadata and clusters the metadata using statistical/machine learning approaches. In the '985 patent, a predefined threshold value from the centroid of a cluster indicates the radius, hence the boundary of the cluster. The system considers the metadata outside of a cluster as abnormal behavior and reports it as a threat.

In the '985 patent, detection requires a pre-existing predictive model (e.g., based on k-mean clustering), which needs to be prepared before detection. The parameters of the predictive model need to be determined, selected, and optimized, e.g., k value in the clustering algorithm and others, distance functions, etc. In contrast, the present invention does not require any pre-existing predictive model, as the detection procedure based on aggregating individual and combined outliers is designed to be automated.

In U.S. Pat. No. 9,609,010, Sipple et al. described a network traffic or communication-based insider threat detection system by observing and building a baseline predictive model from the distribution of volume or count of network traffic or communication. Any network traffic or communication that deviates from the baseline individual or cohort profile is considered as malicious and reported as the incident as an insider threat.

Learning profiles in both the '985 and '010 patents involve complex computation that does not seem to be automatic, e.g., selection of parameters in clustering operations needs human supervision. In comparison, the system of the present invention not only observes the distribution of activities but also learns the distribution. Further, the present invention does not require human intervention (although it is optional) during setup or analysis.

For each detection result, the present invention provides easy-to-understand explanations describing the path of computation and justification, which is new.

The solution in the '985 patent requires the predictive model to be recomputed, upon receiving new log entries. In contrast, the system according to embodiments of the present invention handles new entries efficiently and quickly. There is no need to recompute the distributions, only need to adjust the distribution incrementally, which is lightweight.

Profiles in both the '985 and '010 patents appear static and cannot be dynamically or efficiently adjusted. The model of the present invention will adapt with fluctuations and changes in normal activities. Further, in both the '985 and '010 patents, solutions are provided for analyzing network events. In contrast, the present invention can be applied to all loggable activities.

Additional comparison to existing technologies is described as follows. Existing insider threat detectors use pattern-based feature classification (the '245 patent), representation of log data in feature space (the '985 patent), and volume- or count-based log data distribution (the '010 patent) to identify outlier activities. A limitation of the existing insider threat detection systems is the lack of incorporating uncertainty in the detection models.

The incorporation of uncertainty is important as the insider behaviors can be erratic and unclear. Pattern- or rule-based detections, such as in the '245 patent, fall short for detecting the uncertain or unknown behaviors as these models can detect only activities/behaviors that are already known. Insider threat detectors that construct a base/predicted model using a cluster of log data in the feature space, such as in the '985 patent, or observing the distribution of log data, such as in the '010 patent, may suffer from data perturbation. For example, adding a single outlier may change the entire predicted model. The key to solving the first limitation is to learn and support the ability to recognize and tolerate fluctuations and uncertainties. The probabilistic programming model of the present invention has the ability to handle this uncertainty, adapt to new data, and tolerate data perturbation. Further, the probabilistic programming based detection adapts automatically, without any fixed rules or thresholds.

As with all security systems, some types of threats, e.g., malicious activities that are very similar to normal behavior patterns, may be difficult to detect. However, detection in the present invention is entirely based on historical data and probabilistic evidence, not relying on any predefined rules or thresholds. Thus, it is less likely to be circumvented and bypassed, compared to rule-based detection. Deployment of the inventive detection systems is also easier, as such systems involve a minimum amount of manual configuration.

SUMMARY OF THE INVENTION

Embodiments of the present invention provide systems and methods for insider threat detection relating to computer use, which is especially helpful for organizations. Embodiments are based on probabilistic programming capable of analyzing large amounts of multi-attribute data and logs to identify computer user activities that may fall outside of user norms. In embodiments, the systems and methods are capable of computing a user's behavior deviations with respect to that user's past activities and/or with respect to activities of a group of peers. Results of the analyzing are capable of being presented in a manner that provides the path of the computation, showing what specific activities caused the user to be flagged.

Aspect 1 of the invention comprises a system, the system comprising: a computer processor for executing computer-executable instructions; a memory for storing the computer-executable instructions, wherein the computer-executable instructions are configured to: monitor and analyze a user's computer activity using a dynamic probabilistic programming model configured to learn the distributions of a set of variables related to the user's computer activity and configured to identify one or more outlier events relating to the user's computer activity; and report a threat relating to one or more of the outlier events.

Aspect 2 is the system of Aspect 1, wherein the variables are chosen from one or more of visiting web sites, sending emails, receiving emails, forwarding emails, downloading or uploading from/to the internet or a network, downloading or uploading from an external source such as a memory storage device, logging onto a computer remotely, allowing remote access to a user's computer, logging onto a computer during non-business hours, document content, file content, or email content.

Aspect 3 is the system of Aspect 1, wherein the dynamic probabilistic programming model is configured to reflect as a new norm any fluctuations and/or changes in the user's computer activity, such as relating to new tasks performed by the user.

Aspect 4 is the system of Aspect 2, wherein the dynamic probabilistic programming model is configured to reflect as a new norm any fluctuations and/or changes in the user's computer activity, such as relating to new tasks performed by the user.

Aspect 5 is a method comprising: monitoring and analyzing a user's computer activity using a dynamic probabilistic programming model configured to learn the distributions of a set of variables related to the user's computer activity and configured to identify one or more outlier events relating to the user's computer activity; and reporting a threat relating to one or more of the outlier events.

Aspect 6 is the method of Aspect 5, wherein the variables are chosen from one or more of visiting web sites, sending emails, receiving emails, forwarding emails, downloading or uploading from/to the internet or a network, downloading or uploading from an external source such as a memory storage device, logging onto a computer remotely, allowing remote access to a user's computer, logging onto a computer during non-business hours, document content, file content, or email content.

Aspect 7 is the method of Aspect 5, wherein the dynamic probabilistic programming model is configured to reflect as a new norm any fluctuations and/or changes in the user's computer activity, such as relating to new tasks performed by the user.

Aspect 8 is the method of Aspect 6, wherein the dynamic probabilistic programming model is configured to reflect as a new norm any fluctuations and/or changes in the user's computer activity, such as relating to new tasks performed by the user.

Aspect 9 is a method comprising: monitoring and analyzing a user's computer activity using a dynamic probabilistic programming model configured to aggregate and group multiple outlier events or event sequences relating to the user's computer activity; and reporting a threat relating to the aggregated and grouped multiple outlier events or event sequences.

Aspect 10 is a method comprising analyzing a number of outlier events using a dynamic probabilistic programming model configured to order and rank the severity of aggregated and grouped outlier events or event sequences; and reporting a prioritized list of the outlier events or event sequences.

Aspect 11 is a method comprising: analyzing a number of outlier events using a dynamic probabilistic programming model and providing causes of one or more of the outlier events and/or a computation process for identifying one or more of the outlier events; and reporting results of the analyzing in the form of human readable explanations.

Aspect 12 is the method any of Aspects 9-11, further comprising: by way of a graphic user interface operably configured, allowing a human operator to adjust and/or change the order and the severity of aggregated and grouped outlier events or event sequences; and adjusting the dynamic probabilistic programming model to reflect the human operator adjustments and/or changes.

Aspect 13 is a method comprising any one or more steps of any of Aspects 5-12.

Aspect 14 is a method comprising monitoring and/or analyzing a user's computer activity using the system of any of Aspects 1-4.

Aspect 15 is a method comprising: monitoring computer activities of one or more user; analyzing an output of the monitoring with a probabilistic programming based detection system configured to: compute posterior probabilities from the output of the monitoring to obtain intermediate posterior probabilities; aggregate the intermediate posterior probabilities to obtain aggregated posterior probabilities; calculate anomaly scores from the aggregated posterior probabilities; aggregate the anomaly scores; and prepare a risk profile for the user from the aggregated anomaly scores.

Aspect 16 is the method of Aspect 15, wherein the output of the monitoring comprises logs of individual user actions, activities, and/or behavior.

Aspect 17 is the method of Aspect 15 or 16, wherein anomaly scores are calculated for the user with respect to self and/or with respect to peers of the user.

Aspect 18 is the method of any of Aspects 15-17, wherein the probabilistic programming based detection system is configured to aggregate the anomaly scores by weighted summation based on attribute importance, average, count, or maximum.

Aspect 19 is the method of any of Aspects 15-18, further comprising manually investigating users with risk profiles of concern.

Aspect 20 is the method of any of Aspects 15-19, wherein the risk profile comprises a list of user computer activities of concern.

Aspect 21 is the method of any of Aspects 15-20, further comprising instructing the probabilistic programming based detection system about data attribute types, including but not limited to numerical, categorical, frequency, and rate types.

Aspect 22 is a method of insider threat detection comprising: providing attributes of a user and analyzing the attributes with a probabilistic programming based detection system by: (1) estimating a posterior distribution based on a collected history, $Pr_D(\theta|X)$, of one of the attributes, wherein $\theta$ is parameters of an attribute distribution and X is the collected history of the attribute of the user; (2) determining a user event probability, $P_e$, for an activity, Y, wherein $P_e=Pr_D(e=Y|\theta)$; (3) determining a cumulative abnormal probability, $P_a$, by quantifying a deviation of the user event probability, $P_e$, wherein $P_a=\max(0, Pr_G(P_e<\mu)-Pr_G(P_e<p_i))\times 2=\max(0, 0.5-Pr_G(P_e<p_i)\times 2$, where $\mu$ is an estimated mean and $\sigma$ is an estimated standard deviation; and (4) producing a collection of outlier events of the user as compared with the collected history of the attribute of the user.

Aspect 23 is the method of Aspect 22, further comprising: (5) identifying one or more peer groups of users having similar roles to the user; and (6) repeating 1-4 to produce a collection of outlier events of the user as compared with one or more of the peer groups of users.

Aspect 24 is the method of Aspect 22, further comprising: (7) assigning anomaly scores for each attribute of the user; (8) aggregating the anomaly scores; and (9) reporting the aggregated scores.

Aspect 25 is the method of Aspect 23, further comprising: (7) assigning anomaly scores for each attribute of the user and assigning anomaly scores for each attribute of the peer groups of users; (8) aggregating the anomaly scores; and (9) reporting the aggregated scores.

Aspect 26 is a method of insider threat detection comprising: providing attributes of a user, identifying one or more peer groups of users having similar roles to the user, and analyzing the attributes with a probabilistic programming based detection system by: (1) estimating a posterior distribution $$D_\theta^g$$

of one of the attributes based on the activities of the peer group; (2) determining a user event probability $$P_e^g$$

that is the posterior probability of an activity of the user based on the estimated $$D_\theta^g;$$

(3) determining an anomaly score $$P_a^g$$

by quantifying the deviation of $$P_e^g$$

of one of the users of the peer group of users; and (4) producing a collection of outlier events of the user as compared with the peer group of users.

Aspect 27 is the method of Aspect 26, further comprising: (5) assigning anomaly scores for each attribute of the peer groups of users; (6) aggregating the anomaly scores; and (7) reporting the aggregated scores.

Aspect 28 is the method of any of Aspects 22-27, further comprising assigning a type to one or more of the attributes.

Aspect 29 is the method of Aspect 28, wherein the type is chosen from numerical, categorical, frequency, and rate types.

Aspect 30 is the method of any of Aspects 22-29, wherein the attributes are chosen from one or more of user log on time, user log off time, log on computer ID, removable device usage, number of files copied, number of websites visited, type of websites visited, number of emails sent, and number of external recipients of an email.

Aspect 31 is the method of any of Aspects 22-30, wherein the type of web sites visited and log on computer ID are random variables and follow a categorical distribution.

Aspect 32 is the method of any of Aspects 22-31, wherein one or more of the attributes are normally distributed.

Aspect 33 is the method of any of Aspects 22-32, wherein one or more of the attributes are modeled using a Poisson distribution.

Aspect 34 is the method of any of Aspects 22-33, wherein assigning the type allows the system to infer distributions for different attributes and/or identify dependencies between attributes.

Aspect 35 is the method of any of Aspects 22-34, wherein the reporting of the aggregated scores comprises ranking the anomaly scores from high to low and flagging the users with high anomaly scores.

Aspect 36 is the method of any of Aspects 22-35, further comprising assigning threat levels to the users based on the anomaly scores.

Aspect 37 is the method of any of Aspects 22-36, wherein the threat levels include very high, high, medium, and low.

Aspect 38 is the method of any of Aspects 22-37, wherein the aggregating involves a multi-attribute aggregation calculated for all attributes in $[1, n]$, such that $AA = w_1 \times P_{a1} + w_2 \times P_{a2} + \ldots + w_n \times P_{an}$, where n is the number of attributes, w is attribute weight, and $P_{a1}, P_{a2} \ldots P_{an}$ are the cumulative abnormal probabilities respectively for attributes 1, 2 and up to n.

Aspect 39 is the method of any of Aspects 22-38, wherein: a subset of the attributes are aggregated as a subset-attribute aggregation; and the subset is limited to the attributes associated with insider threat potential.

Aspect 40 is the method of any of Aspects 22-39, wherein the aggregating involves a multi-day aggregation calculated over n days as $AD = \max([P_{a1}, P_{a2}, \ldots, P_{an}])$, wherein $P_{a1}$, $P_{a2} \ldots P_{an}$ are the cumulative abnormal probabilities respectively for days 1, 2 and up to n.

Aspect 41 is the method of any of Aspects 22-40, wherein the aggregating involves a multi-day aggregation calculated over n days as $$AD = \frac{P_{a1} + P_{a2} + \ldots P_{an}}{n},$$

wherein $P_{a1}, P_{a2} \ldots P_{an}$ are the cumulative abnormal probabilities respectively for days 1, 2 and up to n.

Aspect 42 is the method of any of Aspects 22-41, wherein the user belongs to more than one of the peer groups of users.

Aspect 43 is the method of any of Aspects 22-42, wherein the user belongs to more than one of the peer groups of users.

Aspect 44 is the method of any of Aspects 22-43, wherein the aggregating involves a multi-group aggregation and is calculated as $$AG = \frac{P_a^{g1} + P_a^{g2} + \ldots + P_a^{gn}}{n},$$

wherein n is the number of the peer groups of users and wherein $$P_a^{g1}, P_a^{g2} \ldots P_a^{gn}$$

are the cumulative abnormal probabilities respectively for groups 1, 2 and up to n of the peer groups of users.

Aspect 45 the method of any of Aspects 22-44 wherein the aggregating returns the maximum value of the aggregated anomaly scores.

Aspect 46 is the method of any of Aspects 22-45, wherein the reporting comprises specifying the outlier events associated with the anomaly scores that exceed a desired threshold.

Aspect 47 is the method of any of Aspects 22-46, wherein individual event anomaly scores are not stored while per-user, per-day, per-attribute aggregated anomaly scores are stored in a database, such that recomputing of the individual event anomaly scores is capable of being performed from original input logs, given the per-user, per-day, per-attribute aggregated anomaly scores stored in the database, or individual event anomaly scores are stored in the database, e.g., for later retrieval.

BRIEF DESCRIPTION OF THE DRAWINGS

The accompanying drawings illustrate certain aspects of implementations of the present disclosure, and should not be construed as limiting. Together with the written description the drawings serve to explain certain principles of the disclosure.

FIG. 3 is an illustration showing a user interface dashboard or home page including an employee ranking based on threat score.

FIG. 5 is an illustration showing a user interface including a model summary.

FIG. 6 is an illustration showing an example of a user interface result interpretation page for a threat score (0.55003) of employee 'CSF2712' showing relevant abnormal activities.

FIG. 7 is an illustration showing a user interface for adjusting the model.

DETAILED DESCRIPTION OF VARIOUS EMBODIMENTS OF THE INVENTION

Figure 1:
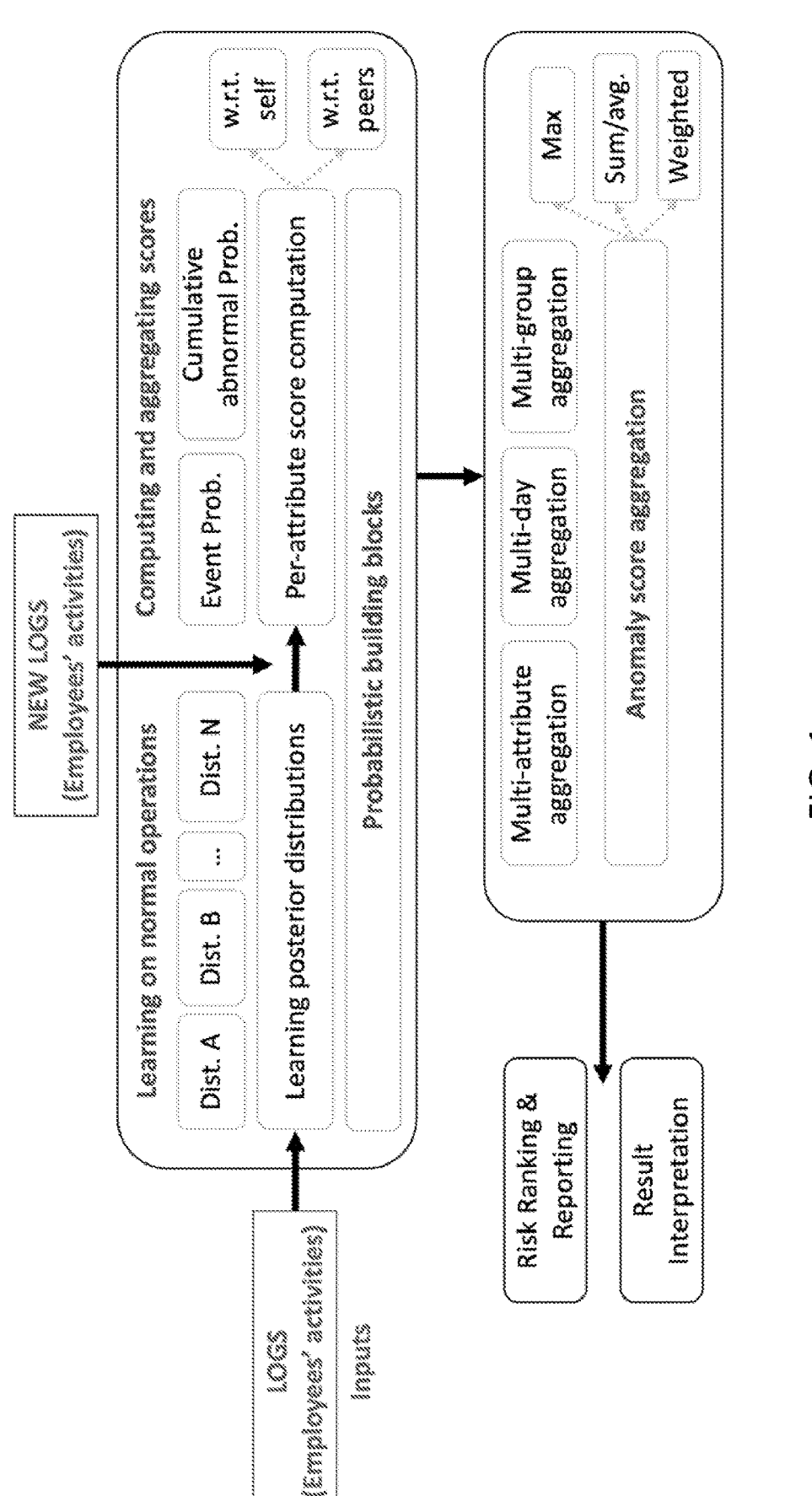
FIG. 1 is an illustration showing a high-level workflow of a probabilistic programming-based insider threat detection system according to an embodiment of the invention.

A recent report from Homeland Security Today pointed out the urgent need for providing evidence-based insider threat detection solutions and explainable analysis procedures. (Philipson, Judy. Improving Insider Threat Detection with Evidence-Based Reporting. Homeland Security Today. Government Technology & Services Coalition. Apr. 22, 2020.) The probabilistic programming based insider threat reasoning and detection system of the present invention is a lightweight, easy-to-use, and easy-to-deploy solution for an organization to detect insider threat anomalies. The core of this system is the ability to efficiently sift through a huge amount of multi-attribute data and logs and recognize outlier user activities by modeling and capturing uncertainties associated with human behaviors. The main features are accuracy, deployability, and scalability. The enabler of the system is a set of computing strategies invented in the paradigm of probabilistic programming. The detection of the present invention does not require pre-defined rules and policies or manual supervision. It handles and adjusts to uncertainties in discovering anomalous patterns.

This new capability to handle uncertainties is particularly relevant for detecting insider threats, as there are usually no clearly defined rules and policies. Rigid rules typically cause excessive false alarms and are undesirable or should be kept to a minimum. The system computes a user's behavior deviations with respect to self's past activities and with respect to activities of a group of peers. It provides a set of comprehensive views to examine the legitimacy of employee activities. The probabilistic evidence based detection does not require any pre-specified thresholds. Thus, the solution is easy to deploy. For explainability, the technology provides the path of the computation, showing what specific activities cause a user to be flagged. The model can also learn how much deviation is acceptable. This result-interpretation unit enables organizations to investigate the causes with high level of accuracy, avoiding costly and embarrassing false alarms.

The novelty of using a probabilistic programming model for detecting insider threats is that the probabilistic model can easily capture uncertainties and fluctuations while capturing the normal circumstances. In the probabilistic programming based detection system, key parameters (e.g., threshold values, threat scores) are automatically learned and adjusted without supervision. The present invention is an evidence-based detection technique that computes the likelihood of anomalous transactions based on a collection of prioritized probabilistic evidence.

The key enabler for achieving full automation is multifold. First, complex human activities are broken down into a collection of smaller measurable attributes, whose posterior probabilistic distributions can be efficiently and automatically computed. This breakdown approach then allows for the leveraging of the law of probability to efficiently compute behavior deviations, in the form of probabilities.

Once these pieces of probabilistic evidence are computed and available, the system aggregates the information and applies an algorithm to estimate and prioritize the risks of activities and individuals. Multiple computation variation options are provided for security analysts to analyze and interpret the logs that influence the sensitivity of the detection (e.g., impacting accuracy and false positive rates). Detection using the inventive system does not require predefined models, parameters, or thresholds representing normal behaviors. The computation can be easily explained, thus the explainability and understandability are high.

In embodiments, there is no training phase necessary (i.e., the detection starts immediately once the system is installed and starts to analyze logs). This no-training-phase feature is due to the lightweight probabilistic programming model, which enables outlier detection computation.

In contrast, existing supervised machine-learning approaches typically require a large amount of labeled training data (e.g., previous insider threat cases), which is usually infeasible in practice and also reduces the ability to detect new threat patterns. Traditional threshold-based detection approaches need one to train extensively and define specific parameter values, which is unrealistic, cumbersome, and costly (in terms of man hours) in practice.

The technology of the present invention can be used in any setting where one needs to detect abnormal patterns and suspicious activities, e.g., industrial espionage, insider threats due to disgruntled employees, and/or operational errors that may result in data loss (for example, accidental forwarding). The typical potential commercial applications include monitoring the online activities of employees of large and/or complex corporations and providing various security analytics reports for the purpose of detecting anomalies such as insider threats.

Technology Details

The main components of the probabilistic programming model include i) computed posterior probabilities of a set of attribute variables, multiple methods to aggregate intermediate posterior probabilities to obtain anomaly scores, and iii) risk ranking and result interpretation.

The output is a risk profile consisting of anomaly scores from multiple aspects (e.g., per day, with respect to self, with respect to peers), which collectively reflect the behaviors of a user. Variables of an insider threat detection system represent the actions, activities, and behavior of a person. For an enterprise organization, inputs to the computation are logs of individual employee actions, activities, and behavior.

Logs are generated by keeping track of employees' major network and file system related activities. These actions, activities, and behavior include login/logoff information, file accesses, URLs of visited websites, file uploads/downloads, sent/received emails, and removable external device usages. In embodiments, logs can be input into the system as raw data files, such as comma separated values (CSV) files.

Overview of Computing Daily Anomaly Scores Based on Posterior Probabilities

The actions or activities and behavior of an employee are divided daily to learn their distributions. Logs represent prior distributions, i.e., the beliefs about the parameters of the distributions of a set of random variables. To infer, true or posterior distributions are needed. Posterior probability $Pr(Y|\theta)$, where Y represents a newly observed value of a variable and $\theta$ represents parameters (e.g., mean, standard deviation) of the distribution corresponding to the variable, is calculated. These parameters are used to capture the normal operations of an employee. The parameters are stored to reconstruct the distribution later for computing probabilities of new data samples.

An intermediate step is to compute distribution parameters $\theta$ from X by statistical inference that maximize the likelihood $Pr(\theta|X)$, where X is the activity history (i.e., logs). In embodiments, a probabilistic programming language, e.g., Pyro, Edward, or PyMC3, can be used to automatically compute these posterior distributions $\theta$ through the stochastic variational inference (SVI) algorithm. The SVI algorithm approximates the optimal $\theta$ that maximizes the likelihood of activity history X. From these posterior probabilities, anomaly scores that quantify an employee's divergence from his/her own history (i.e., self) or peer groups are then computed.

Each day, an anomaly score of an employee's attribute based on a time series of daily posterior probability is calculated. The daily posterior probability is expected to be stable, thus, deviation can be identified. Daily anomaly scores are calculated by quantifying how much deviation of a daily posterior probability occurred compared with other days.

Overview of Aggregating Anomaly Scores Based on Posterior Probabilities

The above computation produces multiple daily anomaly scores for each employee by comparing their daily activities against their own historical records and/or against their peers. These different anomaly scores are aggregated before presenting to security analysts. Aggregation operations are supported from multiple dimensions.

[Aggregate all attributes] The daily anomaly scores for multiple attributes are aggregated to obtain a multi-attribute view. A malicious behavior often involves anomalies in different attributes.

[Aggregate a subset of attributes] Beside aggregating all attributes, flexibility is provided to allow security analysts to specify a subset of attributes. The subset of attributes are automatically selected based on targeted malicious scenarios. This method helps reduce false positives.

[Aggregate over a time period] The anomaly scores for a time period (e.g., every week) are aggregated to highlight the most suspicious behaviors within this period.

[Aggregate with respect to peers] The daily peer-based anomaly scores for different groups are also aggregated.

[Provide multiple aggregation methods] The computation supports different aggregation methods, e.g., weighted summation based on attribute importance, average, count, and maximum. Maximum is appropriate for the multi-day aggregation to highlight the largest outlier.

11

Risk Ranking and Result Interpretation

Aggregated anomaly scores are sorted and high-ranking candidates are identified for further investigation to be performed manually by human analysts. The solution gives multiple anomaly scores, as a number of ways to aggregate individual probabilities are provided, offering a comprehensive reflection of employee behaviors. Result interpretation is for explainability. It shows the path of computation, i.e., showing the activities that cause an employee to be flagged.

A Detailed Step-By-Step Workflow

FIG. 1 illustrates a high-level workflow of a probabilistic programming-based insider threat detection system according to embodiments of the invention. The key steps are as follows.

Step 1. [Input and identification of attributes] The system reads logs as inputs. The system also asks a few simple questions about the input attributes to determine their types, including but not limited to numerical, categorical, frequency, and rate types. The type information helps the system infer distributions automatically for different attributes. The questionnaire also helps identify dependencies between attributes. Example questions are as follows for raw data stored in a comma-separated file, where each column of the file is an attribute, and where the system is able to check each column one at a time to ask the questions. Does this column have date and time information? Does this column have only numbers? Does this column have categorical information such as PC ID, document type, or URL of visited web sites? Does the data of this column have multiple instances of a category? Can the data of this column be divided into smaller intervals such as daily, hourly, etc.?

Step 2. [Daily computation unit 1 for daily per-attribute anomaly score of a user with respect to self] This unit computes how much a user's activities deviate from his or her past activities. It performs the following operations.

a. Estimate the posterior distribution $D_\theta$ of a single attribute of an employee. ($\theta$ is the parameters of the distribution.) According to the information from Step 1, it is assumed that the variables of the attribute follow a certain prior distribution. For numeric data, it is assumed that it follows a Gaussian Distribution. For categorical data, a Categorical Distribution is assumed. Based on all collected histories X, the posterior distribution $Pr_D(\theta|X)$ is estimated by statistical inference functionality provided by a probabilistic programming language such as Pyro.

b. Calculate the event probability $P_e$. The posterior probability is calculated for every event of an employee. Based on the estimated distribution $D_\theta$, the posterior probability is calculated for activity Y according to equation 1:

$$P_e = Pr_D(e = Y|\theta) \qquad \text{(equation 1)}$$

Where $Pr_D(X)$ is the probability of event X according to distribution D. Specifically, $Pr_D(e=Y|\theta)$ is the probability of event Y happening given the estimated parameters $\theta$ of distribution D.

c. Calculate the cumulative abnormal probability $P_a$ by quantifying the deviation of an event probability $P_e$. For a series of event probabilities $[p_1, p_2, \ldots, p_n]$, it is assumed they follow a Gaussian Distribution $G(\mu, \sigma^2)$, where $\mu$ and $\sigma$ are the estimated mean and standard deviation, respectively. For each event i with probabil-

12 ity $P_e=p_i$ where $i \in \{1, 2, \ldots, n\}$, its cumulative abnormal probability is calculated according to equations 2-3:

$$P_a = \max(0, Pr_G(P_e < \mu) - Pr_G(P_e < p_i)) \times 2 \qquad \text{(equation 2)}$$

$$P_a = \max(0, 0.5 - Pr_G(P_e < p_i)) \times 2 \qquad \text{(equation 3)}$$

Where $Pr_G(X)$ denotes the probability of X according to the specified Gaussian Distribution G, $\mu$ is the estimated mean value of distribution G, and $p_i$ is the probability of event i.

Figure 2:
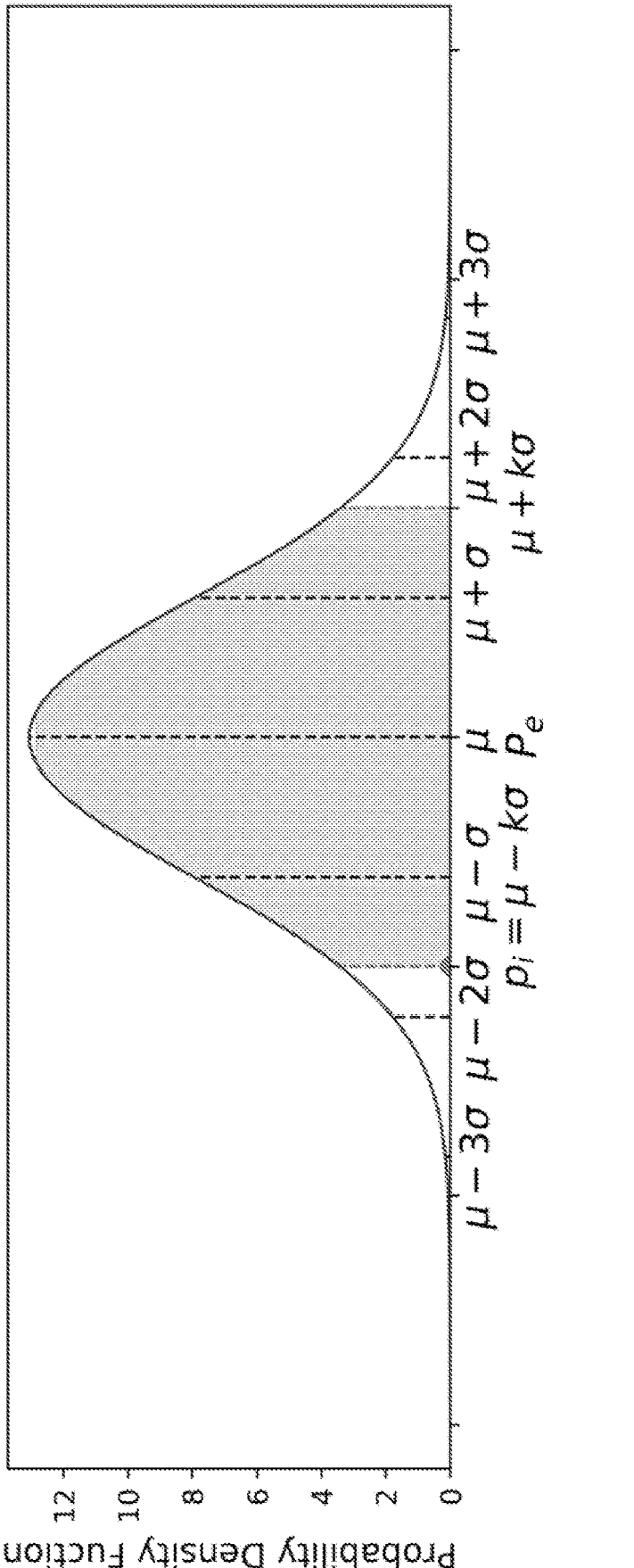
FIG. 2 is a graph showing the gaussian distribution of event probabilities of an employee.

The shadow area in FIG. 2 visualizes the cumulative abnormal probability $P_a$.

$Pr_G(P_e < p_i)$ is the left under the curve area of the vertical line $P_e=p_i$.

$Pr_G(P_e < \mu)$ is the left under the curve area of the vertical line $P_e=\mu$, which always equals 0.5.

When $p_i$ is larger than $\mu$, $Pr_G(P_e < \mu) - Pr_G(P_e < p_i)$ results in a negative value. It is assigned as 0 because larger $P_e$ suggests a normal event, which has no threat. The value is multiplied by 2 to guarantee $P_a \in [0,1]$.

These operations produce a collection of outlier events for each category of distributions. They are intermediate results, i.e., snapshots of employee behaviors, and are further analyzed in the aggregation step (Step 4). These intermediate results alone cannot be used for determining the final insider threats, as they may not be representative and convincing enough, due to the high likelihood of being false positives, i.e., false alarms.

Step 3. [Daily computation unit 2 for daily per-attribute anomaly score of a user with respect to peers] This unit computes how much a user's activities deviate from his or her peer group members. It performs the following operations.

a. Identify a group of employees who have similar work assignments or roles with the user. For example, according to their job information, the employees working on the same projects and/or in similar roles (e.g., tech staff, manager) can be grouped.

b. Estimate the posterior distribution $$D_\theta^g$$

of a single attribute based on the activities of this group.

c. Calculate the event probability $$P_e^g$$

that is the posterior probability of an employee's activity based on the estimated $$D_\theta^g.$$

The computation of this step is identical with step 2b.

d. For each day, an anomaly score $$P_a^g$$

is computed by quantifying the deviation of $$P_e^g$$

of an employee from the group users. Highlight the date when an employee has an unusual deviation from others. The computation of this step is identical with step 2c.

At the end of the above computations, each day each user has a collection of anomaly scores for each attribute with respect to self and with respect to a peer group. Directly examining these many daily per-attribute anomaly scores is not scalable. Thus, the next step describes techniques to aggregate and further interpret these anomaly scores.

Step 4. [Aggregation unit to synthesize anomaly scores] Based on the computed probabilities in Steps 2 and 3, a set of aggregated measurements and views is provided to comprehensively reflect employee activities from multiple angles, which helps expose abnormal behaviors. Multiple methods are provided to aggregate the distribution results from Steps 2 and 3. Each normal or outlier event is represented using a numerical score. To identify critical outlier events daily, the daily scores are combined and aggregated. The score aggregation includes, but is not limited to, the following techniques.

a. Multi-Attribute Aggregation

The anomaly score $P_{ai}$ (cumulative abnormal probability in Step 2c) that is calculated from attribute i is aggregated, for all i in [1, n], where n is the number of attributes. One way to calculate the multi-attribute anomaly score is given in equation 4:

$$AA = w_1 \times P_{a1} + w_2 \times P_{a2} + \ldots + w_n \times P_{an} \quad \text{(equation 4)}$$

Where $w_i$ is the weight for attribute i and $P_{ai}$ is the cumulative abnormal probability for attribute i. Weights reflect the importance of the attributes. Some malicious behaviors can be exposed in this way. For example, the unusual usage of external devices indicates abnormal transfers of files from a computer to external devices. Other examples of unusual usage are described in the exemplary Use Scenarios described below. Thus, the file access events are dependent on the usage of external devices. This dependence is captured using weights. The input questionnaire (Step 1) allows for indication of the dependency and weights. Weights can also be adjusted dynamically.

The initial weights for an employee are assigned by ranking the attributes. Attributes ranked higher will be assigned higher weights. The weights can be adjusted later based on feedback.

A method is given to assign the weight automatically to each attribute.

Each employee has multiple cumulative abnormal probabilities from different attributes. The weight $$w_i^k$$

of employee k for the attribute i is calculated shown in equation 5:

$$w_i^k = \max(0, P_{ai}^k - \frac{\Sigma_{t \in T} P_{ai}^t}{N}) \quad \text{(equation 5)}$$

Where $$P_{ai}^k$$

is the cumulative abnormal probability of an employee k for attribute i. T denotes the set of all employees who have the cumulative abnormal score for attribute i. N is the number of employees in T Weights reflect how much the employee k's cumulative abnormal score is outstanding compared with the average level of all the employees for this attribute.

b. Subset-Attribute Aggregation

A subset of scenario-specific attributes is also aggregated, i.e., only aggregating those attributes relevant to a specific insider threat scenario. For example, in a scenario where an insider logs onto a computer during non-business hours and copies and downloads files to an external memory storage device. In this scenario, the relevant subset of attributes (out of all available ones) includes login time, logon computer ID, and file activities involving external devices. This subset method is a special case of the weighted aggregation, as it is equivalent to assigning zeros as the weights of unselected attributes. This type of aggregation allows the computation to sharply highlight problematic data regions. The subset of attributes and scenarios can be pre-defined, as part of the default system configuration.

c. Multi-Day Aggregation

A multi-day view is also drawn by aggregating the anomaly score of an employee across a time period. Some abnormal behaviors last for a few days. Some malicious behaviors only happen in one day (e.g., the day a fired employee leaves the company). To be comprehensive, one method is to compute the maximum or average for a time period (e.g. every week and/or a sliding window). For the maximum operation, the multi-day aggregation is calculated for n days of an employee according to equation 6:

$$AD = \max([P_{a1}, P_{a2}, \ldots, P_{an}]) \quad \text{(equation 6)}$$

For the average operation, the multi-day aggregation is calculated for n days of an employee as shown in equation 7:

$$AD = \frac{P_{a1} + P_{a2} + \ldots P_{an}}{n} \quad \text{(equation 7)}$$

Where $P_{ai}$ is the cumulative abnormal probability on day i of a user.

The employees are ranked according to both of the aggregation results (e.g., maximum daily anomalous score and averaged daily anomalous score of one week). Users who consistently rank high in both lists would be flagged.

d. Multi-Group Aggregation

An anomaly score $$P_e^g$$

is calculated in Step 3. If an employee belongs to multiple peer groups (e.g., role, project, business units, etc.), then the anomaly scores are calculated for an employee with respect to each of the peer groups.

Since the group values may have a large variance, an average is used to reduce the noise, such as in equation 8:

$$AG = \frac{P_a^{g1} + P_a^{g2} + \ldots + P_a^{gn}}{n}$$ (equation 8)

Where n is the number of groups, $$P_a^{gi}$$

is the anomalous score of this user compared with group i.

In addition, the above aggregated values can be further combined. Self-based and peer-based anomaly scores can be combined.

Aggregation methods. Multiple aggregation methods are allowed in the above computation. The reason for supporting multiple aggregation methods, as opposed to betting on a single one, is to provide comprehensive views of employee behaviors which increases accuracy.

Maximum. It selects the maximum value of the list as the final anomaly score.

Weighted aggregation. This approach gives the option of assigning a weight for every component anomalous score. The weight gives flexibility to pay more attention to important components.

Sum/average. It is a special case of the weighted aggregation that all weights of different components are identical. The scores are normalized or scaled to reduce the subsuming impact of a high-scored event on a low-scored event. Use of this aggregation is recommended for components that are equally important for the activities.

Count. Under this approach, only anomaly scores exceeding a certain amount are counted as alarms. It computes the number of times that an employee triggers alarms.

Step 5. [Reporting and prioritization unit] This operation reports the above set of aggregated anomaly scores to security analysts as follows. The system uses a set of default aggregation methods. Thus, the computation is automatic. Optionally, the system administrator or security analyst can also select the aggregation methods manually through the web interface.

a. This operation sorts the anomaly scores from high to low. There are multiple lists of aggregated anomaly scores, due to various anomaly types (e.g., self-based, peer-based) and aggregation methods.

b. Individuals at the top of these sorted rankings are identified and flagged. This ranking approach allows human analysts to focus on top threats, prioritizing the potentially suspicious activities.

c. Employees that appear across more than one list are identified and flagged.

d. In addition, to make the results appear more intuitive, threat levels (e.g., very high, high, medium, low) can also be reported instead of just numeric anomaly scores.

Step 6. [Result interpretation unit showing the path of computation] During an investigation, a security analyst can expand and decompose the aggregated anomaly scores to learn details and what causes a user to be flagged. This result interpretation unit shows how an anomaly score is computed.

a. For fast backtracking, per-user per-day per-attribute aggregated anomaly scores are stored in a database. A per-user per-day per-attribute aggregated anomaly score refers to the intermediate anomaly score for a single attribute in a day for one user. It is an aggregated score, as it is computed from all the events of the day. This storage operation occurs throughout the cumulative score computation and aggregation process in Steps 2-4, as these values are generated.

b. Individual events' anomaly scores can also be stored, however, their storage overhead would be high. If a high-anomaly-score user, day, and attribute are identified, then each event's anomaly score of that day can be quickly recomputed to pinpoint individual activities that exhibit high anomaly scores. The recomputation is from the original log inputs and follows Steps 2 and 3 described earlier. Thus, storing all events' anomaly scores is unnecessary for result interpretation.

c. Upon request (e.g., mouse click), the stored information is converted to a simple and human-readable format and displayed to the human analyst. The display shows the anomaly score values, associated information including user(s), day(s), attribute(s), and a list of events with high anomaly scores.

Step 7. [Automatic and Human-in-the-loop model adjustments] Extending the above workflow, there are two approaches to adjust weights and parameters involved in the detection model: automatic model adjustment and human-in-the-loop model adjustment, which are explained next.

Automatic model adjustment. Distribution parameters (e.g., $\theta$) are adjusted once anomalous insider cases and events are confirmed and removed from the regular distributions. When new log entries arrive, the model also needs to be updated. New data are used to adjust the estimated posterior distribution constantly in Step 2. This dynamic adjustment can better adapt to recent working patterns of employees, improving detection accuracy.

Human-in-the-loop model adjustment. The system allows a human analyst to manually adjust parameters and configuration settings of the computation, e.g., adjusting weights of attributes in the aggregation computation, updating distribution parameters, etc. This step is optional, as the computation can be fully automated.

Use Scenarios

Several typical insider-related anomalous scenarios are described and how the method detects them is explained. These scenarios are from the insider threat dataset from the CERT division of Carnegie Mellon University.

Scenario 1: Unusual File Transfer and its Detection

This scenario describes some employees who suddenly work after hours, make an unusual number of file transfers from their computers to removable external devices, and upload data to unpopular web sites such as WikiLeaks.

How the method detects unusual file transfer scenarios: According to Step 1 in the step-by-step workflow previously discussed, the relevant attributes such as logon time, logoff time, rate of external device usage per day, rate of file transfers per day, and type of visited websites are identified from the CERT dataset for unusual file transferring.

This scenario is detected by computing per-attribute anomaly scores of a user with respect to self and aggregating the anomaly scores as discussed in Steps 2 and 4 of the step-by-step workflow. This is because event probability and cumulative abnormal probability of an event are computed in Steps 2(b) and 2(c) of the algorithm. In addition, the cumulative abnormal probabilities capture a user's sudden change in logon or logoff behavior, file transfers from their computers to removable external devices, and web visits. Besides, the deviation becomes apparent when the cumulative abnormal probabilities are aggregated using the aggregation techniques discussed in Step 4.

Scenario 2: Data Exfiltration and its Detection

This scenario describes some employees visiting an unusual number of websites and making an unusual number of file transfers from their computers to removable external devices.

How the Method Detects Data Exfiltration Scenarios:

The detection of this scenario follows the same technique as discussed above. This data exfiltration scenario involves a subset of attributes from the unusual file transfer scenario.

Scenario 3: Copy-and-Email and its Detection

This scenario describes some employees (e.g., system administrators) making file transfers from others' computers to removable external devices and sending mass emails.

How the Method Detects Copy-and-Email Scenarios:

The same steps as the unusual file transferring scenario are followed. The relevant attributes, such as the number of file copies per day, daily logins to other users' computers, number of emails sent/received per day, and number of recipients in emails sent by a user are identified.

Similar to the detection of the unusual file transferring scenario, this anomaly can be detected by computing per-attribute cumulative abnormal probabilities of a user with respect to self and aggregating the probabilities as discussed in Steps 2 and 4 of the workflow. In this scenario, the cumulative abnormal probabilities capture a user's sudden change in file transfer rate, logins to other users' machines, and email sending/receiving behavior. The aggregated cumulative abnormal probabilities (Step 4) make the sudden change more visible than the per-attribute cumulative abnormal probabilities.

Scenario 4: File Copy-Back and its Detection

This scenario describes some employees who access files on other employees' machines, copy the files, and email them to their personal email addresses.

How the Method Detects File Copy-Back Scenarios:

The same technique as discussed in the copy-and-email scenario is followed for this detection.

Experimental Evaluation Results for Scenarios 1-4

A prototype of a probabilistic model is implemented to obtain preliminary results and demonstrate how well a probabilistic model can perform to detect insider threats.

Dataset used. For evaluation, the insider threat dataset from the CERT division of Carnegie Mellon University was used. The dataset contains the daily activity logs of more than 3000 employees of an enterprise organization. The logs include each employee's basic information (name/email), login activity, removable device usage behavior, file copy behavior, web browsing behavior, email activity, and psychometric score. For the prototype, nine variables were extracted from the dataset. The nine variables/attributes are:

- logon time (Lon),
- logoff time (Loff),
- logon computer ID (Lpc),
- number of removable device usage per day (D),
- number of file copy per day (F),
- number of websites visited per day (H),
- type of visited websites (T),
- number of email sent per day (Es), and
- number of external recipients of an email (Ner).

According to the dataset, the variables Lon, Loff and Ner are normally distributed. All the rate related attributes, i.e., D, F, H, and Es are discrete random variables. So, the Poisson distribution is used to model them. Random variables T and Lpc follow a categorical distribution.

All-Attribute Ranking Accuracy with Data Version 6.1

The four previously described scenarios are evaluated with four insiders and ten benign users. The exact durations of malicious activities of the four insiders are known. The experiments are conducted with the exact duration as well as four other durations (i.e., one week, two weeks, three weeks, and four weeks) prior to the last date of malicious activities of a user. Table 1 shows the top three rankings of the users under five different duration conditions. The top-3 ranking in each duration condition refers to the three users who have the highest anomaly scores—the user with the highest anomaly score being ranked first. The per-attribute anomaly scores of a user with respect to self are computed (as described in Step 2). The sum/average aggregation method (as described in Step 4f) is used for multi-attribute and multi-day aggregation. For this all-attribute generalized ranking experiment, seven attributes (Lon, Loff, D, F, H, T, and Es) are considered out of the nine attributes. The attributes Lpc and Ner are not considered because they are very scenario-specific attributes.

Out of the 20 different experimental conditions for the four insiders, 2 false positives were observed for R1 (marked by bold font). For these two cases, an insider would be expected to be ranked as first, but a benign user is instead ranked first. The two false positives for R1 are for the two- and three-week duration. The primary reason for these false positives is the impact of a few abnormalities by benign users in some durations. These minor abnormalities fade away when shorter or longer durations are selected. As a result, when an exact/short duration or increased duration is used, no false positives are observed in the rank 1's correctness.

TABLE 1

Top three rankings of users using five different durations. Per-attribute anomaly score of a user is computed with respect to self (see Step 2). Sum/average aggregation method (described in Step 4) for multi-attribute and multi-day aggregation is used. Sc and Cond columns refer to scenarios 1-4 (as previously described) and duration condition, respectively.

| Sc | Cond | Duration | Target User ID | Rank 1 (R1) | Rank 2 (R2) | Rank 3 (R3) | R1 Correctness |
|----|------|----------|----------------|-------------|-------------|-------------|----------------|
| 1 | 1.a | Exact Interval of malicious activities | CSF2712 | CSF2712 | ADH0764 | HJB0462 | ✓ |
|   | 1.b | One week prior to the last date of activity | CSF2712 | CSF2712 | HJB0462 | OGB1192 | ✓ |
|   | 1.c | Two weeks prior to the last date of activity | CSF2712 | CSF2712 | GMF1339 | HJB0462 | ✓ |
|   | 1.d | Three weeks prior to the last date of activity | CSF2712 | CSF2712 | GMF1339 | JPH1910 | ✓ |
|   | 1.e | Four weeks prior to the last date of activity | CSF2712 | CSF2712 | NMM2738 | HJB0462 | ✓ |

TABLE 1-continued

Top three rankings of users using five different durations. Per-attribute
anomaly score of a user is computed with respect to self (see Step 2). Sum/average aggregation
method (described in Step 4) for multi-attribute and multi-day aggregation is used. Sc and Cond
columns refer to scenarios 1-4 (as previously described) and duration condition, respectively.

| Sc | Cond | Duration | Target User ID | Rank 1 (R1) | Rank 2 (R2) | Rank 3 (R3) | R1 Correctness |
|---|---|---|---|---|---|---|---|
| 2 | 2.a | Exact Interval of malicious activities | JPH1910 | JPH1910 | NMM2738 | CSF2712 | ✓ |
| | 2.b | One week prior to the last date of activity | JPH1910 | JPH1910 | LJO1360 | GMF1339 | ✓ |
| | 2.c | Two weeks prior to the last date of activity | JPH1910 | JPH1910 | OGB1192 | MGW3751 | ✓ |
| | 2.d | Three weeks prior to the last date of activity | JPH1910 | JPH1910 | HJB0462 | OGB1192 | ✓ |
| | 2.e | Four weeks prior to the last date of activity | JPH1910 | JPH1910 | ADH0764 | MGW3751 | ✓ |
| 3 | 3.a | Exact Interval of malicious activities | HJB0462 | HJB0462 | ADH0764 | MCS1628 | ✓ |
| | 3.b | One week prior to the last date of activity | HJB0462 | HJB0462 | GMF1339 | LJO1360 | ✓ |
| | 3.c | Two weeks prior to the last date of activity | HJB0462 | GGA0511 | ADH0764 | HAT0738 | x |
| | 3.d | Three weeks prior to the last date of activity | HJB0462 | HJB0462 | ADH0764 | HAT0738 | ✓ |
| | 3.e | Four weeks prior to the last date of activity | HJB0462 | HJB0462 | HAT0738 | MCS1628 | ✓ |
| 4 | 4.a | Exact Interval of malicious activities | LJO1360 | LJO1360 | HJB0462 | HAT0738 | ✓ |
| | 4.b | One week prior to the last date of activity | LJO1360 | LJO1360 | HJB0462 | ADH0764 | ✓ |
| | 4.c | Two weeks prior to the last date of activity | LJO1360 | LJO1360 | HJB0462 | HAT0738 | ✓ |
| | 4.d | Three weeks prior to the last date of activity | LJO1360 | HAT0738 | LJO1360 | HJB0462 | x |
| | 4.e | Four weeks prior to the last date of activity | LJO1360 | LJO1360 | HJB0462 | HAT0738 | ✓ |

All-Attribute Ranking Accuracy with Data Version 5.1

The methods are also evaluated with 10 employee logs from Jan. 2, 2010 to Jun. 2, 2011 collected from the dataset. According to the ground truth, there are 4 employees who performed malicious activities in four non-overlapping periods. Six benign employees were randomly selected for comparison. Two types of experiments were performed:

i) The capability of the method for exposing malicious activities lasting for a period was evaluated. As shown in Table 2, for each period, there is only 1 malicious employee. The multi-day anomaly scores of the 10 employees were calculated and ranked. The results show that the malicious employee is ranked at the 1st in Scenarios 1, 2, 3. In Scenario 4, the malicious employee is ranked 2nd.

ii) The capability of the method for detecting malicious activities in single days was evaluated. For each malicious user, the experiment is performed for the single day when they perform malicious activities. The 10 employees are ranked according to their single-day anomaly scores. Results show that all the insider attackers are ranked 1st, which means the attacks were successfully detected.

TABLE 2

Top three rankings of employees within a duration of multiple days or certain single days.

| Sc | Score Type | Duration | Target User Type | Rank 1 (R1) | Rank 2 (R2) | Rank 3 (R3) | R1 Correctness |
|---|---|---|---|---|---|---|---|
| 1 | Multi | Dec. 1, 2010-Dec. 10, 2010 | JTC1885 | JTC1885 | LFA1456 | PPG0452 | ✓ |
| | Single | Dec. 3, 2010 | JTC1885 | JTC1885 | LFA1456 | TSO1497 | ✓ |
| 2 | Multi | Dec. 20, 2010-Feb. 20, 2011 | LBE0376 | LBE0376 | HLF0469 | YRB0046 | ✓ |
| | Single | Dec. 20, 2010 | LBE0376 | LBE0376 | LFA1456 | NSF0163 | ✓ |
| 3 | Multi | Nov. 10, 2010-Nov. 20, 2010 | BGC0686 | BGC0686 | NSF0163 | YRB0046 | ✓ |
| | Single | Nov. 11, 2010 | BGC0686 | BGC0686 | TSO1497 | JTC1885 | ✓ |
| 4 | Multi | Jul. 20, 2010-Sep. 30, 2010 | JAK0783 | NSF0163 | JAK0783 | HLF0469 | x |
| | Single | Jul. 29, 2010 | JAK0783 | JAK0783 | HLF0469 | BGC0686 | ✓ |

Sc represents malicious scenarios.
Score type refers to the anomaly scores used for ranking.
Multi denotes the multi-day anomaly score.
Single denotes the single-day anomaly score.

Top-k-Attributes Ranking Accuracy with Data Version 6.1

The impact of aggregating top-k malicious attributes on false positives was also evaluated. The top k attribute aggregation experiments were performed using the same set of users and durations as above by varying the value of k (i.e., k={4, 5, 6, 7}). The number of total attributes is 7. In Table 3, it is observed that using all attributes incurs fewer false positives than using top k attributes. This is because the use of more attributes can diminish the effect of the occasional abnormalities of one/two attributes.

TABLE 3

False positive comparison using top-k attributes with k = {4, 5, 6, or 7}.

| Sc | Cond | Duration | Target User ID | R1 Correctness k = 4 | k = 5 | k = 6 | k = 7(all) |
|---|---|---|---|---|---|---|---|
| 1 | 1.a | Exact Interval of malicious activities | CSF2712 | ✓ | ✓ | ✓ | ✓ |
| | 1.b | One week prior to the last date of activity | CSF2712 | ✓ | ✓ | ✓ | ✓ |
| | 1.c | Two weeks prior to the last date of activity | CSF2712 | ✓ | ✓ | ✓ | ✓ |
| | 1.d | Three weeks prior to the last date of activity | CSF2712 | ✓ | ✓ | ✓ | ✓ |
| | 1.e | Four weeks prior to the last date of activity | CSF2712 | ✓ | x | x | ✓ |
| 2 | 2.a | Exact Interval of malicious activities | JPH1910 | ✓ | ✓ | ✓ | ✓ |
| | 2.b | One week prior to the last date of activity | JPH1910 | ✓ | ✓ | ✓ | ✓ |
| | 2.c | Two weeks prior to the last date of activity | JPH1910 | ✓ | ✓ | ✓ | ✓ |
| | 2.d | Three weeks prior to the last date of activity | JPH1910 | ✓ | ✓ | ✓ | ✓ |
| | 2.e | Four weeks prior to the last date of activity | JPH1910 | ✓ | ✓ | ✓ | ✓ |
| 3 | 3.a | Exact Interval of malicious activities | HJB0462 | ✓ | ✓ | ✓ | ✓ |
| | 3.b | One week prior to the last date of activity | HJB0462 | ✓ | ✓ | ✓ | ✓ |
| | 3.c | Two weeks prior to the last date of activity | HJB0462 | x | x | x | x |
| | 3.d | Three weeks prior to the last date of activity | HJB0462 | x | x | x | ✓ |
| | 3.e | Four weeks prior to the last date of activity | HJB0462 | x | x | x | ✓ |
| 4 | 4.a | Exact Interval of malicious activities | LJO1360 | ✓ | ✓ | ✓ | ✓ |
| | 4.b | One week prior to the last date of activity | LJO1360 | ✓ | ✓ | ✓ | ✓ |
| | 4.c | Two weeks prior to the last date of activity | LJO1360 | x | x | ✓ | ✓ |
| | 4.d | Three weeks prior to the last date of activity | LJO1360 | x | x | ✓ | x |
| | 4.e | Four weeks prior to the last date of activity | LJO1360 | x | x | x | ✓ |
| | | Number of false positives | | 6 | 7 | 5 | 2 |

No False Positives Under Scenario-Specific Attribute Subsets

Some attributes are specific to some insider scenarios. For example, the Lon/Loff attribute is specific to scenarios 1 and 2 while the Lpc attribute is specific to scenarios 3 and 4. Thus, to assess the accuracy of scenario-specific attribute subsets, experiments were performed using the same set of users (i.e., four insiders with ten benign users) and durations as previously described. The set of all attributes is Lon, Loff, Lpc, D, F, H, T, Es, and Ner. Table 4 shows the scenario-specific attribute subsets, the accuracy of ranking 1 (R1), and R1 scores. Zero false positives were observed in the R1 ranking. Besides, the scores in the R1 ranking also stand out compared to the scores of R2 and R3 rankings when the duration is close to the exact interval of malicious activities.

TABLE 4

Rank 1 accuracy and anomaly scores under scenario-specific attribute subsets. The complete set of 9 attributes is {Lon, Loff, Lpc, D, F, H, T, Es, Ner}. This setting generates zero false positives.

| Sc | Cond | Duration | Target User ID | # of attributes and names out of 9 total | R1 correctness | Scores R1 | R2 | R3 |
|---|---|---|---|---|---|---|---|---|
| 1 | 1.a | Exact Interval of malicious activities | CSF2712 | 4 {Lon, Loff, D, T} | ✓ | 0.64 | 0.43 | 0.41 |
| | 1.b | One week prior to the last date of activity | CSF2712 | | ✓ | 0.59 | 0.42 | 0.38 |
| | 1.c | Two weeks prior to the last date of activity | CSF2712 | | ✓ | 0.52 | 0.43 | 0.41 |
| | 1.d | Three weeks prior to the last date of activity | CSF2712 | | ✓ | 0.48 | 0.41 | 0.40 |
| | 1.e | Four weeks prior to the last date of activity | CSF2712 | | ✓ | 0.46 | 0.39 | 0.37 |

TABLE 4-continued

Rank 1 accuracy and anomaly scores under scenario-specific attribute
subsets. The complete set of 9 attributes is {Lon, Loff, Lpc, D, F, H,
T, Es, Ner}. This setting generates zero false positives.

| Sc | Cond | Duration | Target User ID | # of attributes and names out of 9 total | R1 correctness | R1 | R2 | R3 |
|----|------|----------|----------------|------------------------------------------|----------------|-----|-----|-----|
| 2 | 2.a | Exact Interval of malicious activities | JPH1910 | 4 {Lon, Loff, D, T} | ✓ | 0.48 | 0.42 | 0.42 |
| | 2.b | One week prior to the last date of activity | JPH1910 | | ✓ | 0.53 | 0.45 | 0.37 |
| | 2.c | Two weeks prior to the last date of activity | JPH1910 | | ✓ | 0.55 | 0.43 | 0.37 |
| | 2.d | Three weeks prior to the last date of activity | JPH1910 | | ✓ | 0.55 | 0.43 | 0.41 |
| | 2.e | Four weeks prior to the last date of activity | JPH1910 | | ✓ | 0.54 | 0.43 | 0.41 |
| 3 | 3.a | Exact Interval of malicious activities | HJB0462 | 3 {Lpc, D, F} | ✓ | 0.61 | 0.42 | 0.41 |
| | 3.b | One week prior to the last date of activity | HJB0462 | | ✓ | 0.41 | 0.32 | 0.30 |
| | 3.c | Two weeks prior to the last date of activity | HJB0462 | | ✓ | 0.43 | 0.38 | 0.31 |
| | 3.d | Three weeks prior to the last date of activity | HJB0462 | | ✓ | 0.42 | 0.36 | 0.30 |
| | 3.e | Four weeks prior to the last date of activity | HJB0462 | | ✓ | 0.42 | 0.36 | 0.30 |
| 4 | 4.a | Exact Interval of malicious activities | LJO1360 | 5 {Lpc, D, F, Es, Ner} | ✓ | 0.45 | 0.41 | 0.37 |
| | 4.b | One week prior to the last date of activity | LJO1360 | | ✓ | 0.45 | 0.39 | 0.37 |
| | 4.c | Two weeks prior to the last date of activity | LJO1360 | | ✓ | 0.45 | 0.41 | 0.37 |
| | 4.d | Three weeks prior to the last date of activity | LJO1360 | | ✓ | 0.42 | 0.40 | 0.40 |
| | 4.e | Four weeks prior to the last date of activity | LJO1360 | | ✓ | 0.39 | 0.39 | 0.39 |

35

Compared to Table 3 (detection with top-k attributes), the detection approach with scenario-based attributes in Table 4 produces fewer false positives. Thus, scenario-based subset-attribute detection can be very useful in practice.

Accuracy Combined with Peer-Based Anomaly Scores

The peer-based anomaly scores are calculated by measuring how much an employee's daily behaviors deviate from his or her peers. For each scenario, 10 employees were tested, but only one was a malicious user. For each employee, a group of peers was collected according to their roles (e.g., salesman, technician, etc). The histories of the peers were used to infer the probabilistic distribution of the normal activities. The event probabilities and cumulative abnormal probabilities were calculated based on the peer-based distribution. Table 5 displays the scores of the top 3 employees ranked according to their self-based anomaly scores, peer-based anomaly scores, and the combined value of them. Both the self-based score and peer-based score achieve the top-1 accuracy at 7/8 while the combined scores achieve the top 1 accuracy at 8/8. The reason is that the malicious user gets high scores in both of the rankings while the false alarms are usually only ranked highly by one type of score occasionally.

TABLE 5

Self-based, peer-based, and combined anomaly scores of the top three employees.

| Sc | Duration/Date | Target | Score Type | Peer or Self | Rank 1 Score | Rank 2 Score | Rank 3 Score | Correctness |
|----|---------------|--------|------------|--------------|--------------|--------------|--------------|-------------|
| 1 | Dec. 1, 2010-Dec. 10, 2010 | JTC1885 | M | Self | 0.5994 | 0.5326 | 0.5136 | ✓ |
| | | | | Peer | 0.6002 | 0.5337 | 0.5249 | ✓ |
| | | | | Combined | 0.5998 | 0.5236 | 0.5179 | ✓ |
| | Dec. 3, 2010 | JTC1885 | S | Self | 0.8076 | 0.5624 | 0.5503 | ✓ |
| | | | | Peer | 0.8432 | 0.6242 | 0.6019 | ✓ |
| | | | | Combined | 0.8245 | 0.5761 | 0.5750 | ✓ |
| 2 | Dec. 20, 2010-Feb. 20, 2011 | LBE0376 | M | Self | 0.5514 | 0.5301 | 0.5179 | ✓ |
| | | | | Peer | 0.5764 | 0.5340 | 0.5225 | ✓ |
| | | | | Combined | 0.5639 | 0.5320 | 0.5202 | ✓ |
| | Dec. 20, 2010 | LBE0376 | S | Self | 0.6220 | 0.5889 | 0.5848 | ✓ |
| | | | | Peer | 0.6069 | 0.5782 | 0.5482 | ✓ |
| | | | | Combined | 0.6145 | 0.5815 | 0.5494 | ✓ |
| 3 | Nov. 10, 2010-Nov. 20, 2010 | BGC0686 | M | Self | 0.5535 | 0.5335 | 0.5179 | ✓ |
| | | | | Peer | 0.5788 | 0.5279 | 0.5237 | ✓ |
| | | | | Combined | 0.5662 | 0.5229 | 0.5160 | ✓ |

TABLE 5-continued

Self-based, peer-based, and combined anomaly scores of the top three employees.

| Sc | Duration/Date | Target | Score Type | Peer or Self | Rank 1 Score | Rank 2 Score | Rank 3 Score | Correctness |
|---|---|---|---|---|---|---|---|---|
| | Nov. 11, 2010 | BGC0686 | S | Self | 0.6312 | 0.5447 | 0.4870 | ✓ |
| | | | | Peer | 0.6738 | 0.5896 | 0.5156 | ✓ |
| | | | | Combined | 0.6525 | 0.5314 | 0.5174 | ✓ |
| 4 | Jul. 20, 2010- | JAK0783 | M | Self | 0.5266 | 0.5222 | 0.5148 | x |
| | Sep. 30, 2010 | | | Peer | 0.5281 | 0.5226 | 0.5209 | ✓ |
| | | | | Combined | 0.5251 | 0.5187 | 0.5164 | ✓ |
| | Jul. 29, 2010 | JAK0783 | S | Self | 0.7150 | 0.6083 | 0.6039 | ✓ |
| | | | | Peer | 0.5865 | 0.5802 | 0.5424 | x |
| | | | | Combined | 0.6196 | 0.5952 | 0.5942 | ✓ |

Sc represents malicious scenarios 1-4.
Score type refers to the anomaly scores used for ranking.
M denotes the multi-day anomaly score.
S denotes the single-day anomaly score.
Peer or Self refers to the activity histories that were used to calculate the scores.
Combined refers to the averaged value of the peer-based anomaly score and self-based anomaly score of each employee.

Key Experimental Findings

1. Rank 1 precision using all attributes is high in the experiment (Tables 1 and 2).

2. Scenario-specific attribute subsets have no false positives in the experiment (Table 4). In addition, anomaly scores of R1 candidates are substantially higher than the anomaly scores of R2 and R3 candidates, resulting in better detection of insiders.

3. Combining the self-based anomaly score (i.e., with respect to self) and peer-based anomaly score (with respect to peers) improves detection accuracy (Table 5).

4. Top-k attributes based detection does not seem to be very effective in reducing false positives in the experiment (Table 3).

5. More historical data helps reduce the number of false positives (Table 1).

Prototype Interfaces

The prototype demonstrates the capability of a probabilistic programming-based insider threat detection system using a web-based application. The web-based application has several key components: Dashboard, Inference and analysis, and Model summary. The prototype uses the probabilistic programming language Pyro. The detection method can be implemented in other languages as well.

The Dashboard page displays the ranking of employees based on their threat scores. A system administrator (i.e., a user of the system) can change activity-duration to observe a different ranking in another duration. FIG. 3 shows the dashboard or home page.

Figure 4:
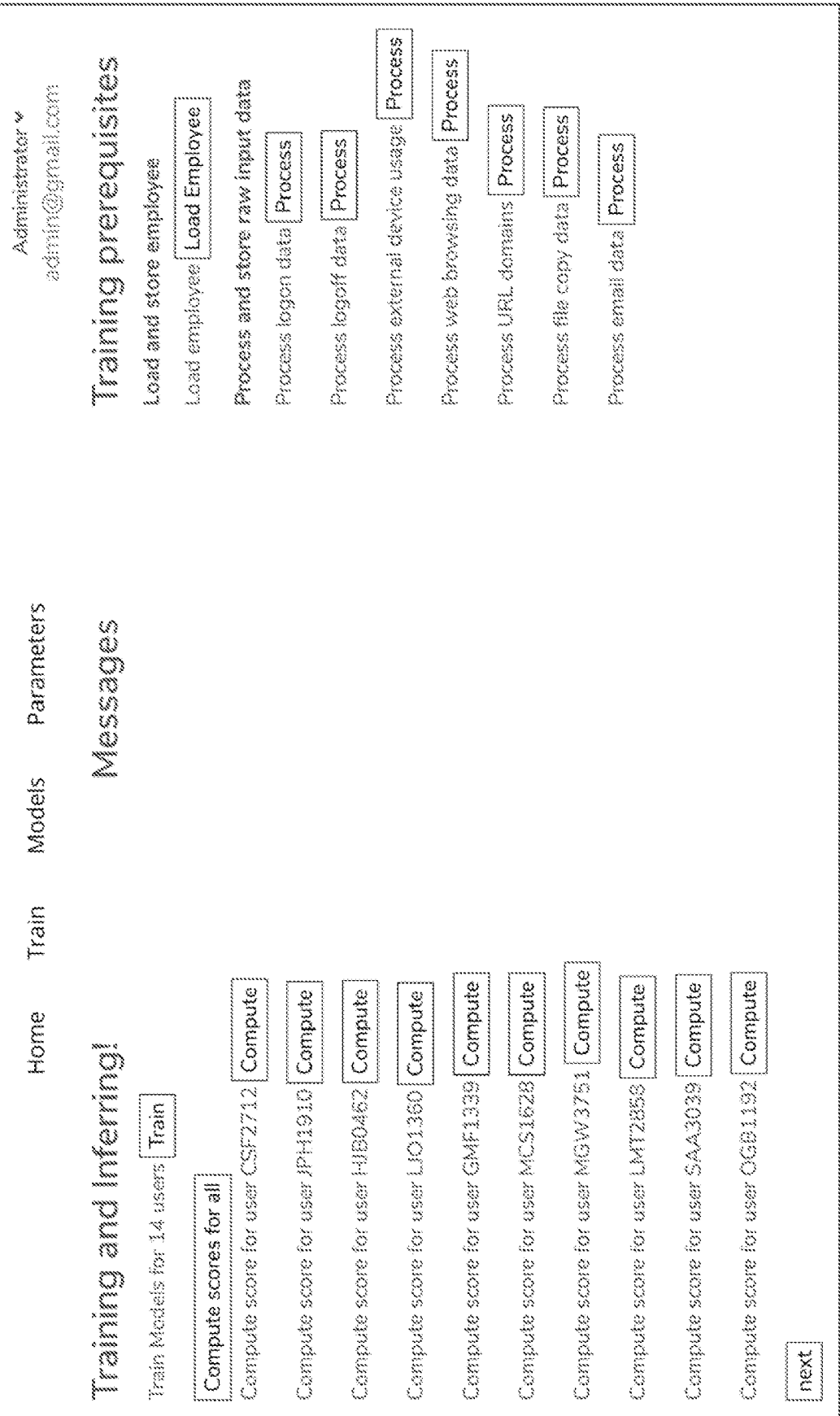
FIG. 4 is an illustration showing a user interface including processing, analysis, and computation options.

The inference and analysis page (FIG. 4) has options to process raw data of user actions to attributes, train probabilistic models, and compute threat scores from user activities based on the learned or trained models. The right side of the interface has options to process raw user actions to attributes and store the attributes in the database. The right side also has the option to update employees in the system. The left side of the page has the options to train probabilistic models for users. The system trains a model per user and stores the model parameters. Further, the left side has the option to compute threat scores from user activities for all users at time or one user at a time. The 'compute' option computes threat scores by aggregating multi-attribute and multi-day scores. The middle part of the page displays messages as the output of actions either from the left or right side of the page.

The model summary page (FIG. 5) displays the learned model parameters for each user. The parameters include the learned parameters for each attribute. This page has also the option to relearn and adjust a user model. The retrain option trains the model again and stores the updated parameters into the database.

The dashboard also displays a result interpretation page which has links for the system administrator to view the justification for the threat score for each employee. The system administrator can view the justification by clicking on the 'Case details' button in the dashboard. The system extracts the information or reasons and presents the information using simple and human-friendly format. FIG. 6 shows the justification for the threat score (0.55003) for employee 'CSF2712' in the prototype. The problematic activity entries that cause high anomaly scores of a user are listed.

The human-in-the-loop page (FIG. 7) provides the opportunity to manually adjust model parameters. This step is optional, as the detection can function completely out of supervision.

Any method or algorithm described herein can be embodied in software or set of computer-executable instructions capable of being run on a computing device or devices. The computing device or devices can include one or more processor (CPU) and a computer memory. The computer memory can be or include a non-transitory computer storage media such as RAM which stores the set of computer-executable (also known herein as computer readable) instructions (software) for instructing the processor(s) to carry out any of the algorithms, methods, or routines described in this disclosure. As used in the context of this disclosure, a non-transitory computer-readable medium (or media) can include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM. The computer-readable instructions can be programmed in any suitable programming language, including Pyro, Edward, PyMC3JavaScript, C, C#, C++, Java, Python, Perl, Ruby, Swift, Visual Basic, and Objective C. Embodiments of the invention also include a non-transitory computer readable storage medium having any of the computer-executable instructions described herein.

A skilled artisan will further appreciate, in light of this disclosure, how the invention can be implemented, in addition to software and hardware, using one or more firmware. As such, embodiments of the invention can be implemented in a system which includes any combination of software, hardware, or firmware. In the context of this specification, the term "firmware" can include any software programmed onto the computing device, such as a device's nonvolatile memory. Thus, systems of the invention can also include, alternatively or in addition to the computer-executable instructions, various firmware modules configured to perform the algorithms of the invention.

According to embodiments, the computing device or devices can include a mainframe computer, web server, database server, desktop computer, laptop, tablet, netbook, notebook, personal digital assistant (PDA), gaming console, e-reader, smartphone, or smartwatch, which may include features such as a processor, memory, hard drive, graphics processing unit (GPU), and input/output devices such as display, keyboard, and mouse or trackpad (depending on the device). Embodiments can also provide a graphical user interface made available on one or more client computers. The graphical user interface can allow a user on a client computer remote access to the method or algorithm.

Additional embodiments of the invention can include a networked computer system for carrying out one or more methods of the invention. The computer system can include one or more computing devices which can include a processor for executing computer-executable instructions, one or more databases, a user interface, and a set of instructions (e.g. software) for carrying out one or more methods of the invention. According to other embodiments, the computing device or devices can be connected to a network through any suitable network protocol such as IP, TCP/IP, UDP, or ICMP, such as in a client-server configuration and one or more database servers. The network can use any suitable network protocol and can be any suitable wired or wireless network including any local area network, wide area network, Internet network, telecommunications network, Wi-Fi enabled network, or Bluetooth enabled network.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Any of the methods disclosed herein can be used with any of the systems disclosed herein or with any other systems. Likewise, any of the disclosed systems can be used with any of the methods disclosed herein or with any other methods. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A system, comprising:
   a computer processor for executing computer-executable instructions;
   a memory for storing the computer-executable instructions, wherein the computer-executable instructions are configured to:
      monitor and analyze a user's computer activity using a dynamic probabilistic programming model configured to learn the distributions of a set of variables related to the user's computer activity and configured to identify one or more outlier events relating to the user's computer activity;
      analyze attributes of the user with the probabilistic programming based detection system by:
         (1) estimating a posterior distribution based on a collected history, $Pr_D(\theta|X)$, of one of the attributes, wherein $\theta$ is parameters of an attribute distribution and X is the collected history of the attribute of the user;
         (2) determining a user event probability, $P_e$, for an activity, Y, wherein $P_e = Pr_D(e=Y|\theta)$;
         (3) determining a cumulative abnormal probability, $P_a$, by quantifying a deviation of the user event probability, $P_e$, wherein $P_a = \max (\theta, Pr_G(P_e < \mu) - Pr_G(P_e < p_i)) \times 2 = \max (0, 0.5 - Pr_G(P_e < p_i)) \times 2$, where $\mu$ is an estimated mean and $\sigma$ is an estimated standard deviation; and
         (4) producing a collection of outlier events of the user as compared with the collected history of the attribute of the user; and
      report a threat relating to one or more of the outlier events.

2. The system of claim 1, wherein the variables are chosen from one or more of visiting websites, sending emails, receiving emails, forwarding emails, downloading or uploading from/to the internet or a network, downloading or uploading from an external source such as a memory storage device, logging onto a computer remotely, allowing remote access to a user's computer, logging onto a computer during non-business hours, document content, file content, or email content.

3. The system of claim 1, wherein the dynamic probabilistic programming model is configured to reflect as a new norm any fluctuations and/or changes in the user's computer activity, such as relating to new tasks performed by the user.

4. The method of claim 1, wherein the dynamic probabilistic programming model is configured to adapt automatically without pre-defined rules or thresholds.

5. The method of claim 1, wherein the dynamic probabilistic programming model does not comprise pre-defined patterns of attributes.

6. The method of claim 1, wherein the dynamic probabilistic programming model is configured to identify the one or more outlier events relating to the user's computer activity without reliance on a pre-existing predictive model.

7. The method of claim 1, wherein the dynamic probabilistic programming model does not rely on manual assumptions.

8. A method comprising:

monitoring and analyzing a user's computer activity using a dynamic probabilistic programming model configured to learn the distributions of a set of variables related to the user's computer activity and configured to identify one or more outlier events relating to the user's computer activity;

providing attributes of the user and analyzing the attributes with the probabilistic programming based detection system by:

(1) estimating a posterior distribution based on a collected history, $\mathrm{Pr}_D(\theta|X)$, of one of the attributes, wherein $\theta$ is parameters of an attribute distribution and X is the collected history of the attribute;

(2) determining a user event probability, $P_e$, for an activity, Y, wherein $P_e=\mathrm{Pr}_D(e=Y|\theta)$;

(3) determining a cumulative abnormal probability, $P_a$, by quantifying a deviation of the user event probability, $P_e$, wherein $P_a=\max (0, \mathrm{Pr}_G(P_e<\mu)-\mathrm{Pr}_G(P_e<p_i)\times 2=\max (0, 0.5-\mathrm{Pr}_G(P_e<p_i)\times 2$, where $\mu$ is an estimated mean and $\sigma$ is an estimated standard deviation; and (4) producing a collection of outlier events of the user as compared with the collected history of one of the attributes; and reporting a threat relating to one or more of the outlier events;

wherein the dynamic probabilistic programming model is not recomputed upon receiving new log entries and instead adjusts the distribution of the set of variables related to the user's computer activity incrementally.

9. The method of claim 8, wherein the variables are chosen from one or more of visiting websites, sending emails, receiving emails, forwarding emails, downloading or uploading from/to the internet or a network, downloading or uploading from an external source such as a memory storage device, logging onto a computer remotely, allowing remote access to a user's computer, logging onto a computer during non-business hours, document content, file content, or email content.

10. The method of claim 8, wherein the dynamic probabilistic programming model is configured to reflect as a new norm any fluctuations and/or changes in the user's computer activity, such as relating to new tasks performed by the user.

11. The method of claim 8, wherein the analyzing further comprises:

analyzing a number of outlier events using a dynamic probabilistic programming model and providing causes of one or more of the outlier events and/or a computation process for identifying one or more of the outlier events; and reporting results of the analyzing in the form of human readable explanations.

12. The method of claim 8, further comprising:

by way of a graphic user interface operably configured, allowing a human operator to adjust and/or change the order and the severity of aggregated and grouped outlier events or event sequences; and adjusting the dynamic probabilistic programming model to reflect the human operator adjustments and/or changes.

13. The method of claim 8, further comprising:

(5) identifying one or more peer groups of users having similar roles to the user; and (6) repeating 1-4 to produce a collection of outlier events of the user as compared with one or more of the peer groups of users.

14. The method of claim 13, further comprising:

(7) assigning anomaly scores for each attribute of the user;

(8) aggregating the anomaly scores; and (9) reporting the aggregated scores.

15. A method comprising:

monitoring computer activities of one or more user;

analyzing an output of the monitoring by analyzing attributes of the user with a probabilistic programming based detection system configured to:

(1) estimate a posterior distribution based on a collected history, $\mathrm{Pr}_D(\theta|X)$, of one of the attributes, wherein $\theta$ is parameters of an attribute distribution and X is the collected history of the attribute;

(2) determine a user event probability, $P_e$, for an activity, Y, wherein $P_e=\mathrm{Pr}_D(e=Y|\theta)$;

(3) determine a cumulative abnormal probability, $P_a$, by quantifying a deviation of the user event probability, $P_e$, wherein $P_a=\max (0, \mathrm{Pr}_G(P_e<\mu)-\mathrm{Pr}_G(P_e<p_i)\times 2=\max (0, 0.5-\mathrm{Pr}_G(P_e<p_i)\times 2$, where $\mu$ is an estimated mean and $\sigma$ is an estimated standard deviation; and (4) produce a collection of outlier events of the user as compared with the collected history of the attribute;

compute posterior probabilities from the output of the monitoring without reliance on a pre-built Bayesian network to obtain intermediate posterior probabilities;

aggregate the intermediate posterior probabilities to obtain aggregated posterior probabilities;

calculate anomaly scores from the aggregated posterior probabilities;

aggregate the anomaly scores; and prepare a risk profile for the user from the aggregated anomaly scores.

16. The method of claim 15, wherein the output of the monitoring comprises logs of individual user actions, activities, and/or behavior.

17. The method of claim 15, wherein the anomaly scores are calculated for the user with respect to self and with respect to peers having similar roles to that of the user.

18. The method of claim 15, wherein the probabilistic programming based detection system is configured to aggregate the anomaly scores by weighted summation based on attribute importance, average, count, or maximum.

19. The method of claim 8, further comprising:

identifying one or more peer groups of users having similar roles to the user, and analyzing the attributes of the user with a probabilistic programming based detection system by:

(1) estimating a posterior distribution $$D_\theta^g$$

of one of the attributes based on the activities of the peer group;

(2) determining a user event probability $$P_e^g$$

that is the posterior probability of an activity of the user based on the estimated $$D_\theta^g;$$

(3) determining an anomaly score $$P_a^g$$

by quantifying the deviation of $$P_e^g$$

of one of the users of the peer group of users; and
    (4) producing a collection of outlier events of the user as compared with the peer group of users.
  20. The method of claim 19, further comprising:
    (5) assigning anomaly scores for each attribute of the peer groups of users;
    (6) aggregating the anomaly scores; and
    (7) reporting the aggregated scores.
  21. The method of claim 14, wherein the aggregating involves a multi-attribute aggregation calculated for all attributes in [1, n], such that $AA = w_1 \times P_{a1} + w_2 \times P_{a2} + \ldots + w_n \times P_{an}$, where n is the number of attributes, w is attribute weight, and $P_{a1}$, $P_{a2}$ . . . $P_{an}$ are the cumulative abnormal probabilities respectively for attributes 1, 2 and up to n.
  22. The method of claim 14, wherein the aggregating involves a multi-day aggregation calculated over n days as $AD = \max([P_{a1}, P_{a2}, \ldots, P_{an}])$, wherein $P_{a1}, P_{a2} \ldots P_{an}$ are the cumulative abnormal probabilities respectively for days 1, 2 and up to n.
  23. The method of claim 14, wherein the aggregating involves a multi-day aggregation calculated over n days as $$AD = \frac{P_{a1} + P_{a2} + \ldots P_{an}}{n},$$

wherein $P_{a1}, P_{a2} \ldots P_{an}$ are the cumulative abnormal probabilities respectively for days 1, 2 and up to n.
  24. The method of claim 20, wherein the user belongs to more than one of the peer groups of users; and
    the aggregating involves a multi-group aggregation and is calculated as $$AG = \frac{P_a^{g1} + P_a^{g2} + \ldots + P_a^{gn}}{n},$$

wherein n is the number of the peer groups of users and wherein $$P_a^{g1}, P_a^{g2} \ldots P_a^{gn}$$

are the cumulative abnormal probabilities respectively for groups 1, 2 and up to n of the peer groups of users.

\*   \*   \*   \*   \*